Figure 1:
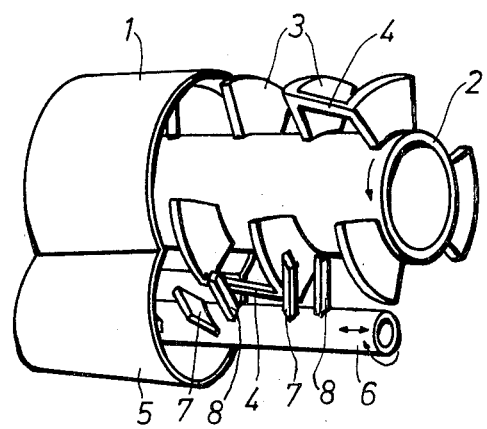

United States Patent [19]

Baurecht et al.

[11] 4,077,972
[45] Mar. 7, 1978

[54] PROCESS FOR THE PREPARATION AND CONDITIONING OF COPPER PHTHALOCYANINE

[75] Inventors: Heinz-Ewald Baurecht; Reinhold Hörnle, both of Colgne; Rudolf Erdmenger, Bergisch Gladbach; Gerd Müller, Cologne; Karlheinz Wolf, Leverkusen, all of Germany

[73] Assignee: Bayer Aktiengesellschaft, Leverkusen, Germany

[21] Appl. No.: 672,854

[22] Filed: Apr. 2, 1976

Related U.S. Application Data

[63] Continuation-in-part of Ser. No. 592,897, Jul. 3, 1975, abandoned.

[30] Foreign Application Priority Data

Jul. 6, 1974  Germany ........................... 2432564
Aug. 6, 1974  Germany ........................... 2437768

[51] Int. Cl.$^2$ ............................................. C09B 47/04
[52] U.S. Cl. .................................................. 260/314.5
[58] Field of Search ...................................... 260/314.5

[56] References Cited

U.S. PATENT DOCUMENTS

| | | | |
|---|---|---|---|
| 2,486,304 | 10/1949 | Loukomsky | 260/314.5 |
| 2,486,351 | 1/1948 | Wiswall, Jr. | 260/314.5 |
| 2,556,730 | 10/1949 | Graham | 260/314.5 |
| 2,964,532 | 12/1960 | Klenke | 260/314.5 |

OTHER PUBLICATIONS

Moser et al., Phthalocyanine Compounds, frontispage and pp. 145-153 and 157-163, Reinhold Pub. Corp. (1963).

*Primary Examiner*—Richard L. Raymond
*Attorney, Agent, or Firm*—Plumley and Tyner

[57] ABSTRACT

A process and apparatus for conditioning crude copper phthalocyanine pigment prepared in a solvent-free process which comprises kneading at a shear gradient of 300–20,000 sec.$^{-1}$ for 10 seconds to 15 minutes and with an energy comsumption of 0.4–50 KWH/Kg. of copper phthalocyanine, a mixture of 1. 1.0 part crude copper phthalocyanine which has not previously been subjected to extractive boiling;
2. 0.1–20 parts of a salt which is soluble in water or in aqueous acids or bases; and
3. 0.3–5 parts of an organic or inorganic solvent or mixture thereof which does not have significant amounts of the pigment or the salt.

7 Claims, 3 Drawing Figures

PROCESS FOR THE PREPARATION AND CONDITIONING OF COPPER PHTHALOCYANINE

This application is a continuation-in-part of application Ser. No. 592,897, filed July 3, 1975, now abandoned.

In its preparation by various baking processes and solvent processes, copper phthalocyanine (CuPc) is in most cases obtained in an impure form which is unusable as a pigment. Thus, the crude material still contains the by-products formed during the synthesis, and the pigment particle size distribution does not lie within the favourable range for achieving optimum pigment properties.

To convert the crude material into a suitable pigment form it has hitherto been necessary first to boil it with acids, and at times additionally also with bases, so as largely to remove the impurities, and then to convert the particle size and particle shape to the favourable range from the point of view of pigment properties.

The previously known methods therefore have the disadvantage that they require very many separate operations so that the process is very time-consuming and costly.

Thus, for example, a customary method of preparation comprises the following process steps:
1. Synthesis of the CuPc in an inert organic solvent.
2. Removal of the solvent.
3. Extractive boiling of the crude product with dilute mineral acid.
4. Drying.
5. Grinding.
6. Conditioning, for example by grinding with salt in a ball mill according to U.S. Pat. No. 2,556,730.
7. Eluting the salt with water or dilute mineral acid.
8. Drying.
9. Grinding.

Hence there existed a need for a simpler process for the preparation of CuPc in the pigment form.

Now if attempts are made to combine the extractive boiling of the crude pigment and the elution of the salt after grinding with salt, so as to save process steps (4), (5) and (7), by grinding the product from the synthesis, without extractive boiling, directly with salt and then removing the impurities with dilute acid, a pale and dull $\beta$-CuPc pigment is obtained, which does not attain the quality of the products which have been prepared without omitting process steps (4), (5) and (7). In accordance with one aspect of the present invention, copper phthalocyanine (CuPc) is conditioned by kneading 1 part by weight of crude material, without prior extractive boiling, directly with 0.1–20 parts by weight, preferably 1–10 parts by weight, of an inorganic or organic salt which is water-soluble, or soluble in an aqueous acid or base and 0.3–5 parts by weight, preferably 0.5–3 parts by weight, of an organic or inorganic solvent or solvent mixture which does not significantly dissolve either the pigment or the salt, and the synthesis by-products, the salt and the solvent are subsequently removed conjointly by extractive boiling. The process proves to be of value particularly in the case of crude CuPc with a maximum CuPc content of 95%, preferably 90%. The process may be used to produce $\beta$-CuPc of a surprisingly high pigment quality on relatively few treatment steps. In principle it is possible to employ any known processes for synthesising the CuPc, but on a large industrial scale in general only two processes are practicable and these processes differ in respect of the starting materials. The first process, known as the "phthalodinitrile process" consists in reacting phthalic acid dinitrile with a copper salt at a temperature up to 250° C. This reaction takes place very exothermically so that it is normally necessary to dilute the reaction mixture with solvent, since excessive temperatures lead to a distinctly reduced yield.

The second process, known as the "urea process", consists in reacting phthalic anhydride or certain derivatives of phthalic anhydride, such as diammonium phthalate, phthalimide and phthalamide, with urea, a copper salt and a catalyst, for example ammonium molybdate, at temperatures between 170° and 250° C. This process is of great industrial importance but presents certain technical difficulties. If phthalic anhydride, urea, a copper salt and the catalyst are heated together, the reaction mixture melts at 115°–130° C, again becomes solid or almost solid at 170°–180° C and at approx. 200° C sometimes additionally passes through a partially liquid phase before CuPc is formed finally. During the entire period of reaction, large amounts of ammonia are liberated, and a considerable quantity of by-products such as ammonium salts sublimes off. Because of this liberation of volatile by-products, the reaction mixture foams and the crude pigment is obtained in the form of a porous reaction cake which tends to stick firmly to the equipment and thus greatly impairs heat transfer. To facilitate degassing and prevent the settling out of individual reactants it is of course advantageous to carry out the reaction with stirring. However, this is difficult because the reaction product sticks tenaciously to the walls of the reaction vessel and to the stirrer, above all to the heated surfaces, so that it is difficult to achieve homogeneous mixing. Furthermore, the caked-on material makes emptying the reaction vessel considerably more difficult.

One seeks to avoid these difficulties by diluting the reaction mixture with an inert solvent, for example nitrobenzene or trichlorobenzene. However, the removal of the solvent demands time-consuming and costly operations such as filtration, distillation and the like. The solvent itself must then be worked up again, which further adds to the expense of the process.

However, solvent-free processes are also known, which in themselves are preferred as the preliminary stage for the conditioning process according to the invention, though they suffer from serious disadvantages. Thus, for example, the premixed components can be spread as a thin layer on metal sheets and these can be heated for some hours to the requisite reaction temperature. The process is very labour-intensive and gives unsatisfactory yields and has therefore been replaced by the solvent process in spite of the above-mentioned disadvantages.

A further process is described in U.S. Pat. No. 2,964,532, and comprises passing a mixture of phthalic anhydride, urea and a metal or metal salt, in a thin layer of ¼ to ½ inch, between the inner surface of a cylinder and a screw rotor within this cylinder, at temperatures between 200° and 250° C. Because of its limitation to the use of a layer of thickness of 0.25 to 0.5 inch, which is necessary to ensure adequate heat transfer and adequate mixing, this process has the disadvantage of a very unfavourable space-time yield, since the volume utilised is only 2,5 to 7% of the total volume of the apparatus if a useful volume of 200 l is assumed.

Such a volume would be necessary for large-scale industrial production of 2,000 tonnes of CuPc per annum. As can be seen from the drawing in U.S. Pat. No. 2,964,532, this volume could only be achieved if the screw shaft was 10 m long and had a diameter of 1 m, which would present exceptional difficulties in the production of the shaft, and the provision of a bearing for it, because of the tolerance limit of 1/16 inch which is required.

The associated high costs of the apparatus make the process uneconomical for large-scale industrial production.

A further process is described in U.S. Pat. No. 3,188,318, in which phthalic anhydride, urea, $Cu_2Cl_2$ and ammonium molybdate are metered into a heated rotating drum which contains a sufficient amount, but at least the throughput of two hours, of a granular copper phthalocyanine reaction product which has already finished reacting, to prevent caking-on. Because of the long residence time and the requisite partial filling of about 25%, this process again requires very large drums if CuPc is to be produced on a large industrial scale. If, for example, it is desired to achieve an annual production of 2,000 tonnes per annum of CuPc in accordance with the instructions of Example 1 of the cited patent specification, a drum of at least 30 cubic meters capacity, filled with approx. 10 tonnes of reaction product, is required and would have to travel at 11 revolutions per minute. A homogeneous temperature pattern is in that case only possible with difficulty, since the apparatus can only be heated externally and the pulverulent reaction product is a poor conductor of heat. Furthermore, when working on this scale, caking-on can no longer be avoided, because of the great weight of the actual reaction mixture, and this results in poorer heat transfer and lowers the throughput and the yield. Though the process is suitable for smaller production units, it cannot be realised on a large industrial scale.

U.S. Pat. No. 3,280,142 claims a process in which the urea method is carried out in a rotary mill, for example a ball mill or pin-disc mill. This discontinous process has the disadvantage that because of the requisite cooling of the reaction mixture, before empyting the apparatus, a cycle time of 90 to 180 minutes is required, though the reaction time is only 5 to 45 minutes. Because of this, and because of the labourintensive emptying process, the economics of the process are very adversely affected.

According to a further aspect of the invention there is provided a process for the preparation of copper phthalocyanine in which optionally substituted phthalic anhydride or a reaction product of phthalic anhydride with ammonia, or its dehydration products, is reacted at a temperature of from 150° to 300° C, preferably 190° to 250° C, with urea, a copper salt and a catalyst, of which a number are mentioned in F. H. Moser and A. L. Thomas, Phthalocyanine Compounds, Reinhold Publishing Corp. (1963), page 151, preferably ammonium molybdate and $MoO_3$, with a residence time of from 5 minutes to 5 hours, preferably 5 minutes to 45 minutes, in a reactor which exhibits the following characteristics:
(a) self-cleaning of at least 75%, preferably 85%, of the heated surfaces,
(b) a useful volume of at least 40%, preferably 50%, of the total volume of the reactor, the useful volume being at least 10 l,
(c) scope for heating within the reactor with a heating surface of at least 34% of the heatable inner surface of the housing.

This convenient and economical process is preferably used to prepare the CuPc conditioned by the conditioning process according to the invention.

Self-cleaning is to be understood as the limitation, occasioned for reasons of the apparatus, to a maximum layer thickness of 2 cm, preferably 1 cm, of material which has caked onto the treated surfaces, or its forced scraping-off, down to a layer thickness of at most 2 cm, preferably at most 1 cm.

The stipulation, according to the invention, of self-cleaning of at least 75% of the heated surfaces can be fulfilled in various ways, for example by means of a simultaneously rotating and oscillating shaft, with the shaft being self-cleaning against kneading bars of suitable geometrical shape fixed to the interior of the housing, or by a twin-screw machine which can have a great variety of embodiments.

A particularly preferred embodiment of such a reactor contains 2 or more stirrers which work in parallel and overlap, in a suitably shaped housing; the main shaft possesses radially mounted disc-shaped elements which are connected at the periphery by kneading bars, and the cleaning shaft, of smaller diameter, has frames mounted on it, and engages with these frames between the disc-shaped elements of the main shaft and cleans their surface continuously, the housing of the cleaning shaft being cleaned by the frames. Both shafts may be heated.

A suitable apparatus for carrying out the process batchwise is shown schematically in FIG. 1.

The main shaft 2 with radially mounted disc-shaped elements 3, which are connected at the periphery by the kneading bars 4, rotates in the cylindrical housing 1. The cleaning shaft 6, equipped with scoops 7 and scrapers 8, rotates in the cylindrical housing 5.

A particularly preferred embodiment of the process according to the invention consists of the use of continuously operating reactors. This is achieved, for example, in the apparatus described above by inclination of the kneading bars and of the frames producing an axial force similar to that of a screw, which transports the product through the machine. This allows the advantage of the short reaction time to be utilised fully since the reaction product can be expelled continuously or semi-continuously without having to be cooled.

Figure 2:
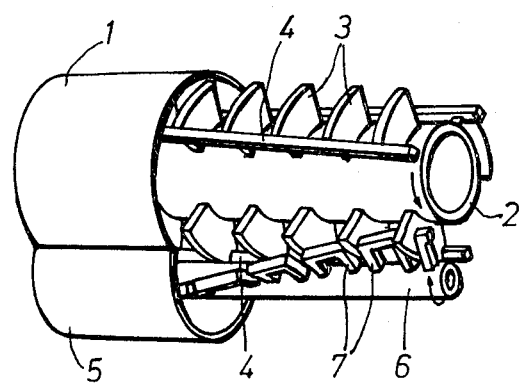

A suitable apparatus for continuously carrying out the process is shown schematically in FIG. 2.

The main shaft 2, which is equipped with disc-shaped elements 3 and kneading bars 4, rotates in the housing 1. The cleaning shaft 6 is equipped with the frames 7 and rotates in the housing 5.

A particularly suitable apparatus is the AP-reactor of Messrs. H. List (Pratteln, Switzerland), with which the experiments described in the examples were also carried out. The reactors can be made of steel, but also of other constructional materials, for example of Hastelloy, titanium or enamelled steel.

Examples of suitable phthalic acid derivatives are phthalic anhydride, diammonium phthalate, phthalimide, phthalic acid diamide, amino-iminoisoindolenine, 1-amino-3-oxo-isoindolenine and the corresponding phthalic acid derivatives substituted by halogen, such as chlorine and bromine, $C_1$-$C_4$-alkyl, such as methyl and ethyl, phenyl, $C_1$-$C_4$-alkoxy, such as methoxy and ethoxy, and sulpho.

Phthalic anhydride and mixtures of phthalic anhydride and 4-chlorophthalic acid are preferred.

Examples of suitable copper salts are copper sulphate, copper chloride and basic copper carbonate.

Basic copper carbonate is preferred.

The components phthalic acid derivative, urea and copper salt are suitably employed in molar ratios of 4:(6–30); (0.8–2), preferably 4:(10–20):(0.9–1.2).

The amount of catalyst is 0.01–1% by weight, relative to the amount of the phthalic acid derivative, and preferably 0.1 to 0.6% by weight.

Reverting now to the conditioning process of the invention, the step of kneading with salt can be carried out discontinuously or continuously. A paticularly preferred salt kneading process is characterised in that a mixture of the crude material, a salt and a solvent is subjected, in a continuously operating kneading apparatus with spatially separate facilities for adding liquid, to a shear gradient of 300 to 20,000 sec.$^{-1}$, preferably 500–5,000 sec.$^{-1}$, over a period of 10 seconds to 15 minutes at temperatures between 100° and 300° C, the amount of solvent being so chosen that the energy taken up during kneading is between 0.4 and 20 kWh/kg of pigment passed through.

For the preferred salt kneading process it is possible to use twin kneading screws and quadruple kneading screws, as well as single kneading screws which have kneading bars of suitable geometrical shape fixed to the housing and which can, in addition to the rotation, also execute oscillating movements.

The ZSK kneading screw of Messrs. Werner and Pfleiderer may be mentioned as an example.

The particularly preferred continuous salt kneading process has the advantage, over known salt kneading processes (U.S. Pat. No. 2,982,666 and German Offenlegungsschrift (German Published Specification) No. 1,919,496), in which, however, the crude CuPc pigments employed had always already been extracted by boiling with acid, dried and ground, that it gives, for shorter residence times, pigments with a more uniform crystal shape and a narrower paticle size spectrum. These advantageous properties manifest themselves paticularly in the ease of flow, dispersibility, depth of colour, fastness to light and fastness to weathering.

The temperatures in at least a part of the kneading zones are between 120° and 350° C, preferably between 160° and 280° C.

Suitable solvents are those which boil above 140° C and are liquid under the kneading conditions. Particularly suitable solvents are those which are at least slightly soluble in water or dilute aqueous acids or bases, such as polyhydric aliphatic alcohols, for example ethylene glycol, propylene glycol or glycerol, ethanolamines, phenols, anilines, polyethylene glycols, propylene glycols, monoesters and monoethers of polyethylene glycols and polypropylene glycols, polyethyleneamines, N-alkylated and N-hydroxyalkylated polyethyleneimines and N-monosubstitued and N-disubstituted anilines, wherein possible substituents are alkyl, hydroxyalkyl, alkoxyalkyl, polyalkoxyalkyl, alkylaminoalkyl and polyalkylaminoalkyl groups, of which the polyalkoxy and polyalkylamine parts are derived from ethylene oxide, propylene oxide, ethyleneimine or propylenimine. Furthermore, silicone oils, phosphoric acid amides and phosphoric acid esters, and salt melts of salts and salt mixtures, for example aluminum chloride and zinc chloride, should be mentioned.

Examples of suitable inorganic and organic salts are sodium chloride, potassium chloride, sodium sulphate, zinc chloride, aluminum chloride, aluminum sulphate, calcium carbonate, sodium acetate, potassium sodium tartrate, calcium acetate or sodium citrate.

Particularly suitable solvents are polyhydric alcohols and their partial ethers.

The following examples illustrate the invention.

EXAMPLE 1

104 kg of phthalic anhydride, 168 kg of urea, b 20.1 kg of basic Cu carbonate containing 54–56% of Cu and 0.8 kg of ammonium molybdate were introduced per hour into a 125 l AP-Conti reactor of Messrs. List, Pratteln/Switzerland. The main shaft was rotated at 100 revolutions per minute and the temperature of the heating oil was set so that in the last one-third of the reactor the reaction mixture reaches a temperature of 225° C. The crude material thus obtained had a CuPc content of approx. 75%.

90 g of this crude material were kneaded with 270 g of NaCl and 60 ml of aniline for 1 hour in a 250 ml four-shaft kneader at 120°–135° C, cooled, extracted by boiling twice for 2 hours with 2.5 l of 5% strength hydrochloric acid, washed with hot water until free from acid and dried at 80° C.

The pigment thus obtained, which was entirely in the β-modification, showed great depth of colour and brilliance after incorporation into an offset binder on a disc-type grinding apparatus, or into a toluene gravure printing binder.

EXAMPLE 2

Figure 3:
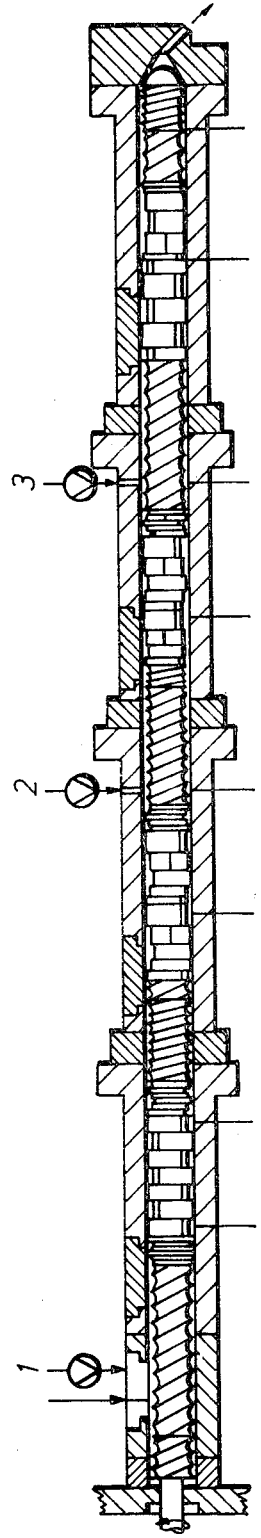

10.2 kg/hr of the CuPc crude pigment which had been prepared as described in Example 1, and 41 kg/hr of rock salt were introduced into a type ZSK-530 kneading screw of Messrs. Werner and Pfleiderer, Stuttgart, which was provided with a kneading fitment as indicated in FIG. 3. Diethylene glycol was metered in at the rate of approx. 5.9 kg/hr through the feed nozzle 1, 0.935 kg/hr through nozzle 2 and 1.25 kg/hr through nozzle 3. The screw speed was set to 295 revolutions per minute and the larger amount of diethylene glycol was readjusted so that the power consumed by the kneading screw was 28 kW. The apparatus was cooled over its entire length with water at 85° C flowing at approx. 1,000 l/hr. The kneaded mass which issued was at a temperture of approx. 160° C.

100g of the kneaded mass which issued were extracted by boiling twice with 2.5 kg of 5% strength hydrochloric acid for two hours, and filtered offhot, and the pressed cake was washed with water until free from acid and dried at 80° C.

The CuPc pigment in the β-modification, thus obtained, showed great depth of colour and brilliance in offset binders and toluene gravure printing binders, coupled with good flow and dispersibility.

EXAMPLE 3

71 kg of phthalic anhydride, 116 kg of urea, 18.3 kg of CuCl$_2$ (anhydrous) and 0.35 kg of MoO$_3$ were metered per hour into a 125 l AP-Conti reactor of Messrs. List, Pratteln/Switzerland. The main shaft was rotated at 10 revolutions per minute and the temperature of the heating oil was set so that the reaction mixture reached a temperature of 240° C in the last one-third of the reactor. The reaction mixture was twice extracted by boiling with a 10-fold amount of 5% strength hydrochloric acid and is filtered hot, and the product was washed with hot water until free from acid and dried at 100° C.

The amount of extractively boiled crude CuPc thus obtained corresponded to a yield of 80% of theory, based on phthalic anhydride.

The crude CuPc thus obtained must additionally be subjected to a primary conditioning in accordance with known processes, such as are extensively described in the patent literature, such as, for example, a salt grinding, bead mill grinding with solvent, or salt kneading, so as to convert it to the pigment form of the greenish-tinged blue β-modification, or a sulphuric acid paste treatment to convert it to the reddish-tinged blue α-modification.

If the conditioning process according to the invention is used, the two-fold extractive boiling with hydrochloric acid can be omitted.

EXAMPLE 4

104 kg of phthalic anhydride, 168 kg of urea, 20.2 kg of basic Cu carbonate containing 54–56% of Cu and 0.8 kg of ammonium molybdate were introduced per hour into a 125 l AP-Conti reactor made from VA steel. The main shaft was rotated at 10 revolutions per minute and the temperature of the heating oil was so adjusted that the reaction mixture reaches a temperature of 225° C in the last one-third of the reactor. The reaction product was worked up as described in Example 1. The determination of the yield showed a yield of 75%, based on phthalic anhydride.

It was particularly noteworthy that after a duration of the experiment of 48 hours there were no signs of corrosion. A determination of the Fe content in the reaction product gave 22–45 ppm of Fe, a value which is easily explicable by the Fe content of the starting products.

A further advantage is the ease with which the product can be conditioned in accordance with the known methods to give a deeply coloured pigment of the β-modification.

EXAMPLE 5

110 kg of phthalic anhydride, 31 kg of 4-chlorophthalic acid, 31 kg of $CuCl_2$, 200 kg of urea and 1 kg of ammonium molybdate are introduced into a 125 l AP-Conti reactor. The experiment was carried out, and the product worked up, as in Example 2. The yield was 75%, based on $CuCl_2$.

After a sulphuric acid paste treatment, a reddish-tinged blue CuPc pigment in the α-modification, having a chlorine content of approx. 4%, was obtained, which showed great stability to aromatic solvents with regard to change of modification and crystal growth.

We claim:

1. Process for conditioning crude copper phthalocyanine which has been synthesized in a solvent-free process, the conditioning process comprising kneading at a shear gradient of 300–20,000 sec.$^{-1}$, for a period of 10 seconds to 15 minutes, and with an energy consumption of 0.4–50 kWh/kg. copper phthalocyanine treated, a mixture of
    1. 1.0 part by weight of crude copper phthalocyanine, which has not been subjected previously to extractive boiling;
    2. 0.1–20 parts by weight of a salt selected from the group consisting of sodium chloride, potassium chloride, sodium sulphate, zinc chloride, aluminum chloride, aluminum sulphate, calcium carbonate, sodium acetate, potassium sodium tartrate, calcium acetate, and sodium citrate; and
    3. 0.3–5 parts by weight of a solvent which is organic, inorganic or a mixture thereof which boils above 140° C, which remains liquid under the kneading conditions, and which does not dissolve significant amounts of copper phthalocyanine or of said salt.

2. Process of claim 1 wherein said solvent is a polyhydric alcohol or a partial ether of a polyhydric alcohol.

3. Process of claim 1 wherein said crude copper phthalocyanine is prepared from phthalic anhydride, copper carbonate and urea in the presence of ammonium molybdate or molybdenum trioxide.

4. Process of claim 1 wherein said crude copper phthalocyanine is prepared by reacting for 5–45 minutes at 150°–300° C a mixture of: 1. phthalic anhydride, substituted phthalic anhydride, reaction product of phthalic anhydride and ammonia, or dehydrated reaction product of phthalic anhydride and ammonia; 2. urea; 3. a copper salt; and 4. a catalyst;
in a reactor exhibiting the following characteristics:
   a. at least 75% of the heated surfaces being selfcleaning;
   b. a useful volume of at least 10 liters representing at least 40% of the total volume of said reactor; and
   c. scope for heating within the reactor with a heating surface of at least 34% of the heatable inner surface of the housing.

5. Process of claim 4 wherein at least 85% of the heated surfaces of said reactor are self-cleaning, and said useful volume is at least 50% of the total volume of said reactor.

6. Process of claim 4 wherein said copper salt is copper sulphate, copper chloride, or basic copper carbonate; and said catalyst is ammonium molybdate or molybdenum trioxide.

7. Process according to claim 4, wherein phthalic anhydride, or mixtures of phthalic anhydride and 4-chlorophthalic acid, copper carbonate and urea are reacted in the presence of ammonium molybdate or molybdenum trioxide.

* * * * *